(12) United States Patent
Ina et al.

(10) Patent No.: US 10,814,838 B2
(45) Date of Patent: Oct. 27, 2020

(54) ONBOARD OPTICAL SENSOR CLEANING DEVICE

(71) Applicant: DENSO CORPORATION, Kariya-shi, Aichi-ken (JP)

(72) Inventors: Eiji Ina, Kariya (JP); Keita Saito, Kariya (JP); Yuji Hayashi, Kariya (JP); Keita Kawai, Kariya (JP); Tomoyuki Kikuta, Kariya (JP)

(73) Assignee: DENSO CORPORATION, Kariya-shi, Aichi-ken (JP)

( * ) Notice: Subject to any disclaimer, the term of this patent is extended or adjusted under 35 U.S.C. 154(b) by 196 days.

(21) Appl. No.: 16/086,566

(22) PCT Filed: Feb. 7, 2017

(86) PCT No.: PCT/JP2017/004435
§ 371 (c)(1),
(2) Date: Sep. 19, 2018

(87) PCT Pub. No.: WO2017/169140
PCT Pub. Date: Oct. 5, 2017

(65) Prior Publication Data
US 2019/0100171 A1 Apr. 4, 2019

(30) Foreign Application Priority Data

Mar. 31, 2016 (JP) .................................. 2016-072930
Apr. 4, 2016 (JP) .................................. 2016-075306

(51) Int. Cl.
*B60S 1/52* (2006.01)
*B60S 1/54* (2006.01)
(Continued)

(52) U.S. Cl.
CPC .................. *B60S 1/56* (2013.01); *B08B 3/02* (2013.01); *B60S 1/52* (2013.01); *B60S 1/54* (2013.01);
(Continued)

(58) Field of Classification Search
CPC .... B60S 1/52; B60S 1/528; B60S 1/54; B60S 1/56; B60S 1/0848
See application file for complete search history.

(56) References Cited

U.S. PATENT DOCUMENTS 5,657,929 A * 8/1997 DeWitt ..................... B60S 1/52
15/250.02
2002/0005440 A1 1/2002 Holt et al.
(Continued)

FOREIGN PATENT DOCUMENTS

JP 09315270 A * 12/1997 ................ B60S 1/52
JP 2003-532511 A 11/2003
(Continued)

OTHER PUBLICATIONS

JPH09315270—Machine Translation (Year: 1997).*
(Continued)

*Primary Examiner* — Marc Lorenzi
(74) *Attorney, Agent, or Firm* — Kilpatrick Townsend & Stockton LLP

(57) ABSTRACT

An onboard optical sensor cleaning device ejects fluid against a sensing surface of an onboard optical sensor installed in a vehicle and removes foreign matter from the sensing surface. The onboard optical sensor cleaning device includes a cleaning liquid ejection port that ejects supplied cleaning liquid and an air ejection port that ejects supplied air. The cleaning liquid ejection port and the air ejection port are independent from each other, an air ejection axis of the air ejection port is set so that the ejected air mixes with the cleaning liquid ejected from the cleaning liquid ejection port and to be directed toward the sensing surface.

13 Claims, 14 Drawing Sheets

(51) Int. Cl.
  *B60S 1/56* (2006.01)
  *B08B 3/02* (2006.01)
  *H04N 5/225* (2006.01)
  *H04N 7/18* (2006.01)
  *B60S 1/60* (2006.01)
  *B60R 1/00* (2006.01)

(52) U.S. Cl.
  CPC ............... *B60S 1/60* (2013.01); *H04N 5/225* (2013.01); *H04N 7/18* (2013.01); *B60R 1/00* (2013.01)

(56) References Cited

U.S. PATENT DOCUMENTS

| | | | |
|---|---|---|---|
| 2003/0047621 A1* | 3/2003 | Fukushima | F04D 15/0016 239/284.1 |
| 2003/0075207 A1* | 4/2003 | Fukushima | B60S 1/50 134/123 |
| 2008/0210780 A1* | 9/2008 | Discher | B60S 1/528 239/284.2 |
| 2013/0092758 A1 | 4/2013 | Tanaka et al. | |
| 2015/0078940 A1 | 3/2015 | Kikuta et al. | |
| 2015/0343999 A1 | 12/2015 | Lopez Galera et al. | |
| 2017/0021809 A1* | 1/2017 | Trebouet | B60S 1/52 |
| 2017/0021810 A1* | 1/2017 | Trebouet | B08B 3/02 |
| 2017/0028968 A1 | 2/2017 | Kubota et al. | |
| 2018/0086318 A1* | 3/2018 | Grasso | B60S 1/54 |

FOREIGN PATENT DOCUMENTS

| | | |
|---|---|---|
| JP | 2009-018250 A | 1/2009 |
| JP | 2014-37239 A | 2/2014 |
| JP | 2015083830 A | 4/2015 |
| JP | 2015-224032 A | 12/2015 |
| JP | 2016034623 A | 3/2016 |
| WO | 2015/159763 A1 | 10/2015 |
| WO | WO-2017080614 A1 * 5/2017 ......... G02B 27/0006 |
| WO | 2017/169140 A1 | 10/2017 |

OTHER PUBLICATIONS

International Search Report for PCT/JP2017/004435 dated Apr. 4, 2017, 2 pages.
International Preliminary Report on Patentability for PCT/JP2017/004435 dated Oct. 2, 2018, all pages.

* cited by examiner

ONBOARD OPTICAL SENSOR CLEANING DEVICE

TECHNICAL FIELD

The present invention relates to an onboard optical sensor cleaning device that cleans a sensing surface of an optical lens, a protection glass, or the like of an onboard optical sensor installed in a vehicle.

BACKGROUND ART

Various types of safety devices that include an optical sensor at the front, rear, or the like of a vehicle have been implemented in the prior art to ensure driving safety using an optical signal of the optical sensor.

Such an optical sensor senses optical signals around the vehicle and imaging data around the vehicle through a sensing surface of an optical lens, a protection glass, or the like that is exposed to the outside. Consequently, the optical sensor functions to notify a driver on whether or not there is an obstacle.

The above sensing surface of the optical lens, the protection glass, or the like is exposed to the outside of the vehicle and easily becomes unclean. Accordingly, it is preferred that the vehicle include an onboard optical sensor cleaning device that removes smudge from the optical lens in order to obtain a stable optical signal or imaging data.

Patent document 1 discloses a camera cleaning device that cleans a lens surface by ejecting high-pressure air and cleaning water from a single nozzle.

Patent document 2 discloses a cleaning system that cleans a lens surface by ejecting high-pressure air and cleaning water from two independent nozzles.

Patent document 3 discloses a cleaning device that cleans a sensing surface by ejecting high-pressure air against a sensing surface (lens surface).

PRIOR ART DOCUMENTS

Patent Documents

Patent Document 1: Japanese Laid-Open Patent Publication No. 2014-37239
Patent Document 2: Japanese Laid-Open Patent Publication No. 2015-224032
Patent Document 3: International Publication No. (WO) 2015/159763

SUMMARY OF THE INVENTION

Problems that are to be Solved by the Invention

The camera cleaning device of patent document 1 ejects cleaning water from the nozzle and then ejects high-pressure air for a predetermined time to force out the cleaning water remaining in the nozzle. However, the cleaning water remaining in the nozzle cannot be completely forced out. Thus, when subsequently ejecting only high-pressure air to remove rain water or the like, the cleaning water mixes with the high-pressure air and collects on the lens surface. Thus, a stable optical signal or imaging data cannot be obtained.

In the cleaning system of patent document 2, high-pressure air and cleaning water are supplied through independent passages and nozzles to prevent the cleaning water from mixing with the high-pressure air.

However, the high-pressure air is ejected against the lens surface after the ejection of the cleaning water against the lens surface. This lowers the cleaning performance. Thus, smudge cannot be sufficiently removed from the lens surface.

In the onboard optical sensor cleaning device of patent document 3, since an air ejection port is located on a fixed position relative to the sensing surface, the cleaning performance is low. More specifically, the air ejection port of the above onboard optical sensor cleaning device needs to be located at a position that does not interfere with sensing of an onboard optical sensor and cannot be located at a position near the front of the sensing surface. Thus, the air ejection port is arranged at a position nearby a side end of the sensing surface and ejects air from this position. As a result, when the sensing surface is particularly a spherical lens surface or the like, the air that strikes the sensing surface is limited at part of the sensing surface. As a result, it will be difficult to clean the entire sensing surface in a preferred manner.

It is an object of the present invention to provide an onboard optical sensor cleaning device that increases the cleaning performance while allowing for the ejection of only air.

Means for Solving the Problem

To achieve the above object, an onboard optical sensor cleaning device according to one aspect of the present disclosure ejects fluid against a sensing surface of an onboard optical sensor installed in a vehicle and removes foreign matter from the sensing surface. The onboard optical sensor cleaning device includes a cleaning liquid ejection port that ejects supplied cleaning liquid and an air ejection port that ejects supplied air. The cleaning liquid ejection port and the air ejection port are independent from each other. An air ejection axis of the air ejection port is set so that the ejected air mixes with the cleaning liquid ejected from the cleaning liquid ejection port and to be directed toward the sensing surface.

EMBODIMENTS OF THE INVENTION

One embodiment of a vehicle will now be described with reference to FIGS. 1 to 12.

Figure 1:
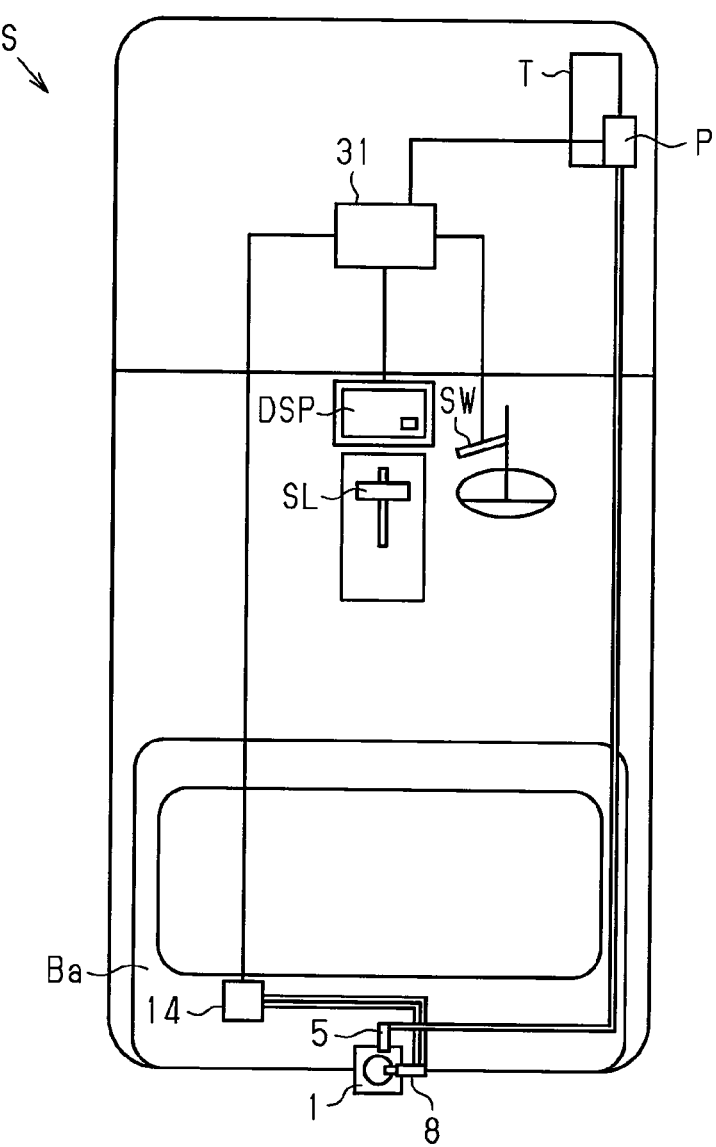
FIG. 1 is a schematic diagram showing a vehicle according to one embodiment of the present disclosure.

As shown in FIG. 1, a back door Ba is arranged at the rear of a vehicle S, and an onboard camera 1 serving as an onboard optical sensor is arranged on the back door Ba.

Figure 2:
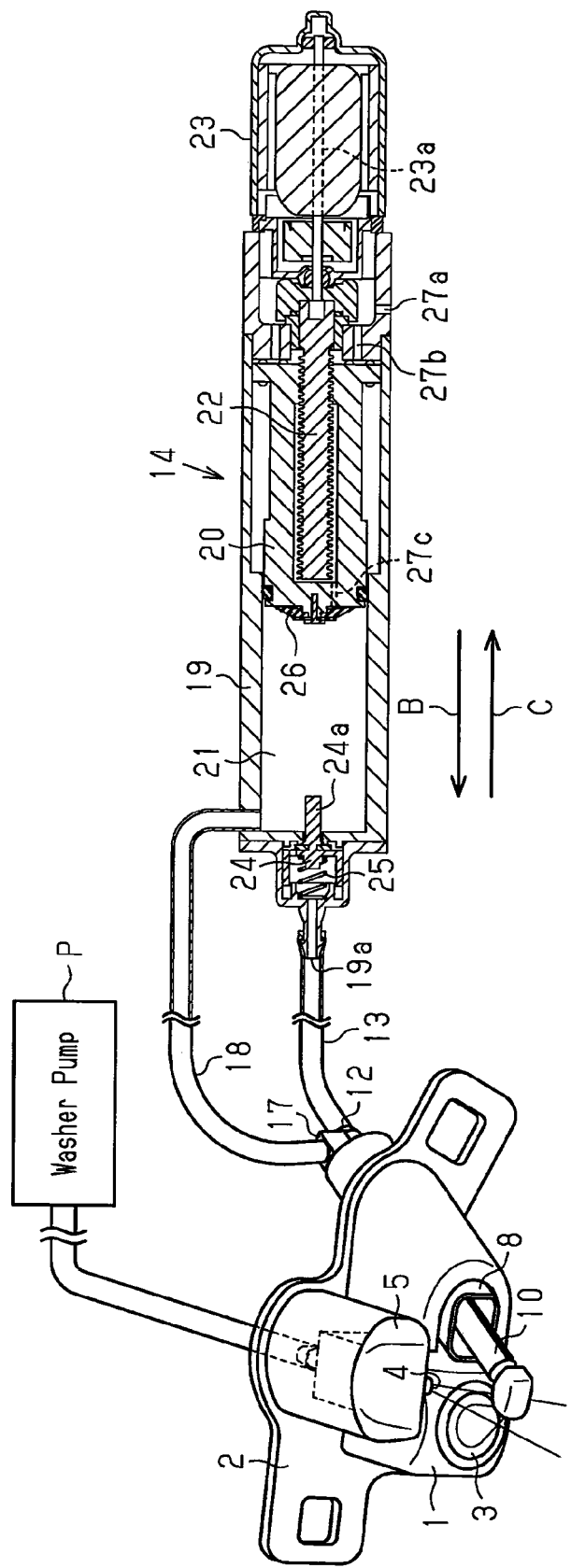
FIG. 2 is a schematic diagram showing an onboard optical sensor cleaning device of the embodiment.
Figure 3:
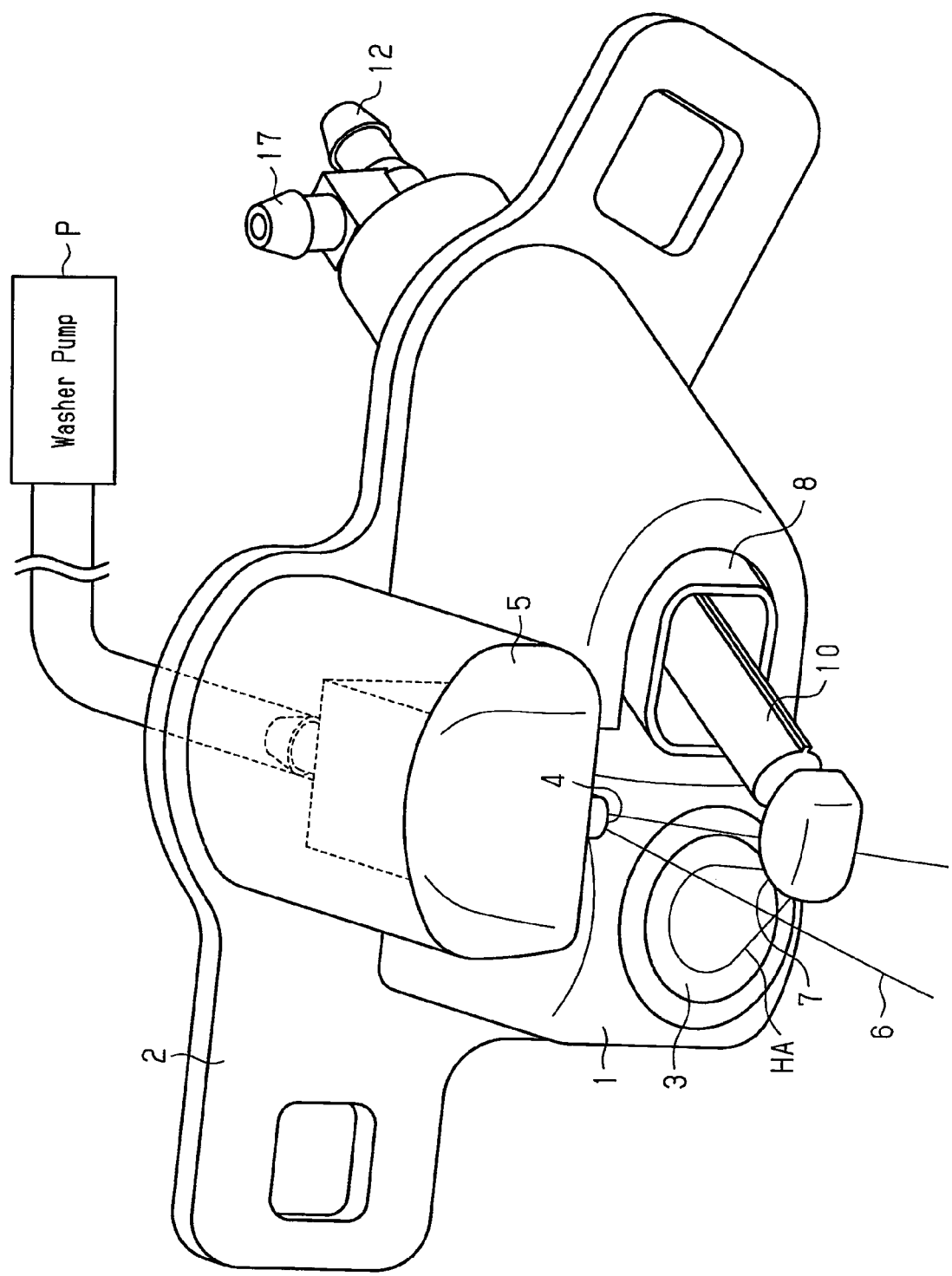
FIG. 3 is a perspective view showing first and second nozzle units.

As shown in FIGS. 2 and 3, the onboard camera 1 is coupled to a coupling frame 2 and attached to the back door Ba by the coupling frame 2. The onboard camera 1 includes a lens surface 3 serving as a sensing surface exposed toward the rear of the vehicle. As shown in FIG. 1, when, for example, a shift lever SL of a transmission is operated to a reverse position, the onboard camera 1 transmits a captured image of the rear of the vehicle S to a display DSP in the vehicle so that the display DSP shows the captured image.

Figure 4:
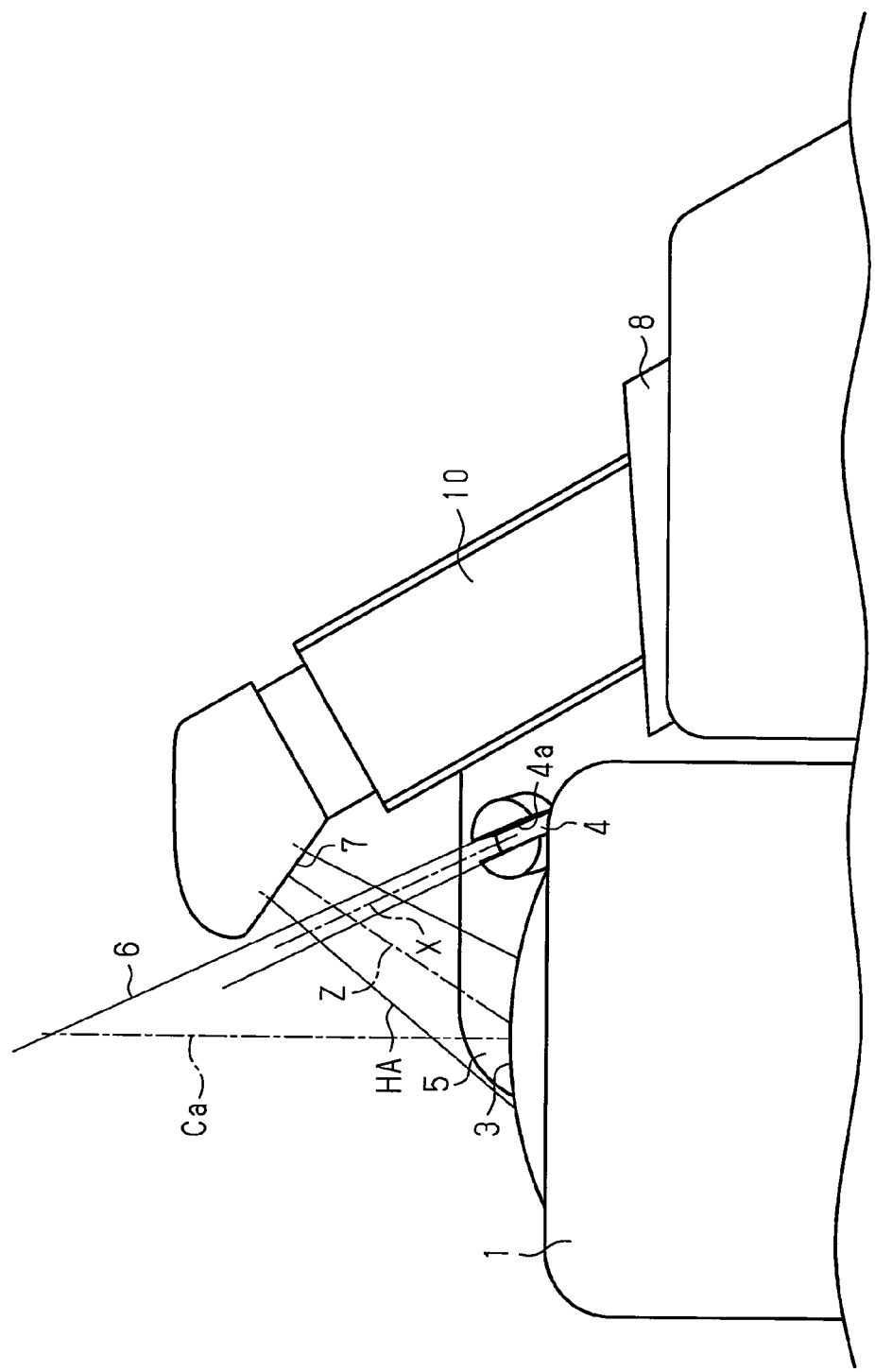
FIG. 4 is a bottom view showing the first and second nozzle units.

As shown in FIGS. 3 and 4, a first nozzle unit 5 including a cleaning liquid ejection port 4 is coupled to the coupling frame 2, and the first nozzle unit 5 is supplied with cleaning liquid from a reservoir tank T when a washer pump P (refer to FIG. 1) moves. When the cleaning liquid is supplied, the first nozzle unit 5 ejects cleaning liquid 6 from the cleaning liquid ejection port 4.

The cleaning liquid ejection port 4 is located diagonally upward from the lens surface 3. Further, as shown in FIG. 4, the cleaning liquid ejection port 4 includes a constriction 4a. The constriction 4a includes two opposing surfaces spaced apart by a narrow gap and two opposing surfaces spaced apart by a wide gap to eject the cleaning liquid in a wall-like manner.

A second nozzle unit 8 serving as an air ejection nozzle or a fluid ejection nozzle is coupled to the coupling frame 2. The second nozzle unit 8 includes an air ejection port 7 (refer to FIGS. 4 and 5) serving as a fluid ejection port.

Figure 5:
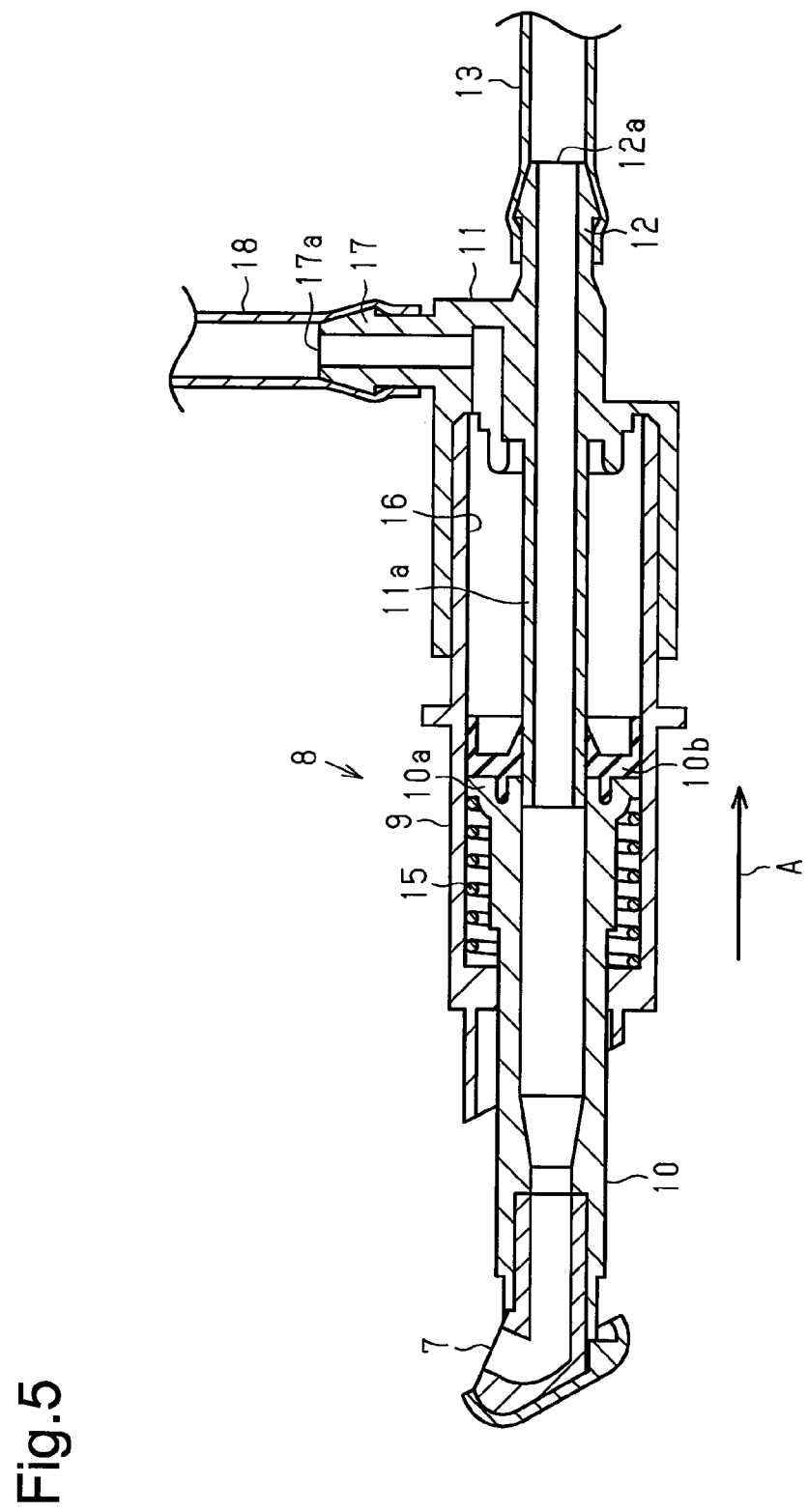
FIG. 5 is a cross-sectional view showing the second nozzle unit.

As shown in FIG. 5, the second nozzle unit 8 includes a tubular movable nozzle member 10 that is supported to be projectable from and retractable into a tubular case 9 and movable forward and backward. Further, the air ejection port 7 is provided on a distal end of the movable nozzle member 10. The air ejection port 7 opens in a direction substantially perpendicular to the forward and backward movement direction.

A basal end closing member 11 is fitted onto a basal end of the case 9. In the present embodiment, the case 9 and the basal end closing member 11 form a housing. The basal end closing member 11 includes a tubular cleaning air intake pipe 11a located in the case 9 and extending in the forward movement direction of the movable nozzle member 10. The cleaning air intake pipe 11a is inserted into (fitted into) the tubular movable nozzle member 10. The movable nozzle member 10 is supported so that the movable nozzle member 10 is movable forward and backward along the case 9 and the cleaning air intake pipe 11a. Further, the basal end closing member 11 includes a first joint 12 located outside the case 9 and extending toward an opposite side of the cleaning air intake pipe 11a. The first joint 12 includes an ejection air intake port 12a serving as an ejection fluid intake port that is in communication with the cleaning air intake pipe 11a. The first joint 12 is connected to an air pump 14 (refer to FIG. 2) by a first supply pipe 13.

In the second nozzle unit 8, when high-pressure cleaning air is supplied from the air pump 14 through the first supply pipe 13, high-pressure air HA is ejected from the air ejection port 7 via the ejection air intake port 12a, the cleaning air intake pipe 11a, and the inside of the movable nozzle member 10.

In the case 9, a coil spring 15 is arranged around the movable nozzle member 10. One end of the coil spring 15 abuts against a flange 10a arranged on a basal end portion of the movable nozzle member 10, and the other end of the coil spring 15 abuts against a distal end portion of the case 9. Biasing force of the coil spring 15 from the distal end portion of the case 9 constantly biases the movable nozzle member 10 in the backward (retraction) direction (direction of arrow A in FIG. 5).

In addition, the basal end of the case 9 includes a sealed chamber 16 defined by the basal end portion of the movable nozzle member 10 (flange 10a). A seal rubber 10b is fixed to the basal end portion of the movable nozzle member 10 (flange 10a). The seal rubber 10b seals (slides in contact with) an inner circumferential surface of the case 9 and an outer circumferential surface of the cleaning air intake pipe 11a to maintain the airtightness of the sealed chamber 16. The basal end closing member 11 includes a second joint 17 located outside the case 9 and extending in a direction orthogonal to the first joint 12. The second joint 17 includes a forward movement air intake port 17a serving as an forward movement fluid intake port that is in communication with the sealed chamber 16 and allows fluid to enter the sealed chamber 16. The second joint 17 is connected to the air pump 14 (refer to FIG. 2) by a second supply pipe 18.

In the second nozzle unit 8, the supply of air from the air pump 14 through the second supply pipe 18 increases the pressure of the sealed chamber 16. This pushes out the movable nozzle member 10 from the case 9 and moves forward the movable nozzle member 10. As a result, as shown in FIGS. 3 and 4, the air ejection port 7 is arranged at an ejection position beside the lens surface 3 (in vehicle widthwise direction) close to a position in front of the lens surface 3. This ejects the high-pressure air HA from the air ejection port 7, which is arranged at the ejection position, toward the lens surface 3. Additionally, in the second nozzle unit 8, when the pressure of the air is reduced in the sealed chamber 16, the biasing force of the coil spring 15 moves backward the movable nozzle member 10. This moves the air ejection port 7 away from the position in front of the lens surface 3 to a non-ejection position. The second nozzle unit 8 does not need and thus does not include a check valve.

As shown in FIG. 2, the air pump 14 includes a tubular pump case 19. A piston 20 is supported in the tubular pump case 19 so as to be movable back and forth. A compression chamber 21 is defined between a distal end of the piston 20 and an inner distal end surface of the pump case 19.

A drive shaft 22 is fastened to the piston 20. The circumferential surface of the drive shaft 22 is threaded. A basal end of the drive shaft 22 is coupled to an output shaft 23a of a motor 23. When the motor 23 is actuated to forward-rotate the drive shaft 22, the piston 20 moves forth toward the distal end of the pump case 19 (direction of arrow B). This reduces the volume of the compression chamber 21 and pressurizes (compresses) the air in the compression chamber 21. When the motor 23 is actuated to reverse-rotate the drive shaft 22, the piston 20 moves back toward the basal end of the pump case 19 (direction of arrow C). This increases the volume of the compression chamber 21 and depressurizes the air in the compression chamber 21.

The second supply pipe 18 that is in communication with the compression chamber 21 is connected to the distal end of the pump case 19. When air is pressurized in the compression chamber 21, the air is supplied through the second supply pipe 18 and the forward movement air intake port 17a to the sealed chamber 16 of the second nozzle unit 8.

The distal end of the pump case 19 includes a discharge port 19a coupled to the first supply pipe 13. Further, the pump case 19 includes a discharge valve 24 located between the compression chamber 21 and the discharge port 19a. The discharge valve 24 is operated (pushed) and opened by the piston 20 when it moves forth. More specifically, the discharge valve 24 is biased in a direction in which a coil spring 25 closes a communication hole between the compression chamber 21 and the discharge port 19a and in a direction opposite to the direction in which the piston 20 moves forth (that is, direction in which piston 20 moves back). The discharge valve 24 includes an operation bar 24a projecting toward the piston 20. When the operation bar 24a is pushed by the distal end of the piston 20 moving forth, the compression chamber 21 and the discharge port 19a (first supply pipe 13) are in communication with each other.

Thus, when the piston 20 moves forth (in direction of arrow B) to compress the air in the compression chamber 21 and the piston 20 pushes the operation bar 24a, the high-pressure air compressed in the compression chamber 21 is instantaneously discharged out of the discharge port 19a. The air is supplied from the first supply pipe 13 to the ejection air intake port 12a.

The piston 20 includes a suction valve 26 (umbrella valve). The suction valve 26 opens when the piston 20 moves back (in direction of arrow C) and the pressure becomes negative in the compression chamber 21. This causes air to enter the compression chamber 21 through communication holes 27a, 27b, and 27c from the outside of the pump case 19.

As shown in FIG. 5, when air enters the sealed chamber 16 pushing the movable nozzle member 10 forward out of the case 9, the air ejection port 7 moves toward the ejection position close to the position in front of the lens surface 3 (refer to FIG. 4). In this state, when the discharge valve 24 (refer to FIG. 2) opens, the high-pressure air HA is ejected from the air ejection port 7 toward the lens surface 3.

As shown in FIG. 4, an air ejection axis Z of the air ejection port 7 is set to be directed toward the lens surface 3 so that the ejected air HA mixes with the cleaning liquid 6 ejected from the cleaning liquid ejection port 4. From a different perspective, the air ejection port 7 is set so that the air ejection axis Z of the ejected air HA is directed toward the lens surface 3 and passes through the cleaning liquid 6 ejected from the cleaning liquid ejection port 4. In other words, the air ejection port 7 is set so that the air ejection axis Z of the ejected air is directed toward the lens surface 3, and the cleaning liquid ejection port 4 is set so that the ejected cleaning liquid 6 intersects the air ejection axis Z.

Further, the cleaning liquid ejection port 4 of the present embodiment is set so that the cleaning liquid ejection axis X of the ejected cleaning liquid 6 extends in a direction that differs from a direction extending toward the lens surface 3 (direction that does not intersect lens surface 3). In addition, the cleaning liquid ejection port 4 of the present embodiment is set so that the cleaning liquid ejection axis X of the ejected cleaning liquid 6 passes through a position close to the air ejection port 7 between the air ejection port 7 and the lens surface 3.

Additionally, the lens surface 3 includes a region closer to the air ejection port 7 than a center axis Ca and a region farther from the air ejection port 7 than the center axis Ca. The air ejection port 7 of the present embodiment is set so that the air ejection axis Z of the ejected air HA intersects the lens surface 3 at a position in the region of the lens surface 3 closer to the air ejection port 7. Further, the air ejection port 7 of the present embodiment is set so that the air ejection axis Z of the ejected air HA intersects (in the present embodiment, is orthogonal to) planar surfaces of the wall-like cleaning liquid 6 ejected from the cleaning liquid ejection port 4 (surface of cleaning liquid 6 extending in direction orthogonal to thickness-wise direction of wall-like cleaning liquid 6). In other words, the constriction 4a of the cleaning liquid ejection port 4 is set so that the planar surfaces of the ejected wall-like cleaning liquid 6 intersect (in the present embodiment, are orthogonal to) the air ejection axis Z.

Figure 12:
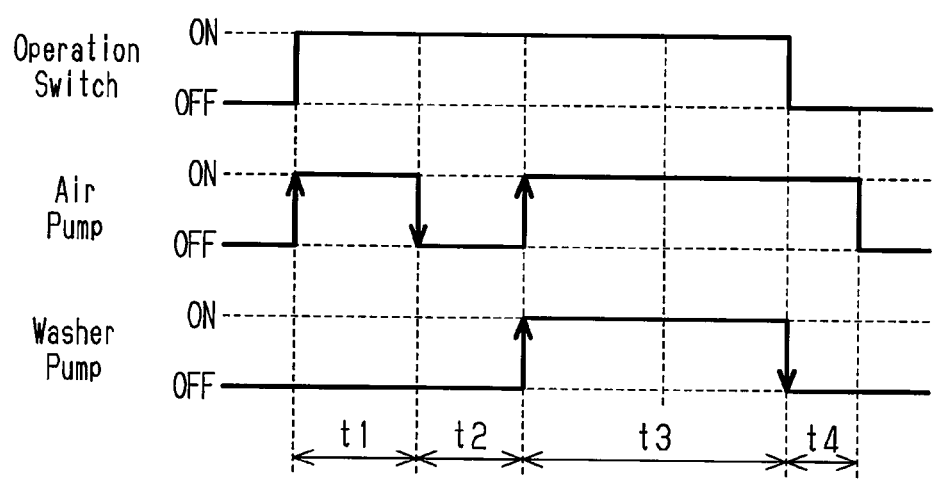
FIG. 12 is a time chart showing action timings of the air pump and a washer pump.

As shown in FIG. 1, the washer pump P and the air pump 14 are electrically connected to a controller 31 and are controlled by the controller 31 when the driver operates an operation switch SW. Referring to FIG. 12, when the operation switch SW is operated, the controller 31 first actuates the air pump 14 over a fixed time t1. This ejects the high-pressure air HA from the air ejection port 7.

Then, when, for example, smudge cannot be removed from the lens surface 3 by the high-pressure air HA and the driver continues to operate the operation switch SW, the controller 31 de-actuates the air pump 14. The controller 31 waits for a predetermined fixed time t2 and then actuates the air pump 14 and the washer pump P. Further, the controller 31 ejects the cleaning liquid 6 from the cleaning liquid ejection port 4 and ejects the high-pressure air HA from the air ejection port 7 over a fixed time t3.

Subsequently, if the driver stops operating the operation switch SW, the controller 31 stops the washer pump P. Then, the controller 31 continues to actuate the air pump 14 over a fixed time t4. This, for example, blows away the cleaning liquid from the lens surface 3. When actuated, the air pump 14 repeatedly moves the piston 20 back and forth and repeatedly ejects the high-pressure air HA from the air ejection port 7.

The operation of the onboard optical sensor cleaning device will now be described.

Figure 6:
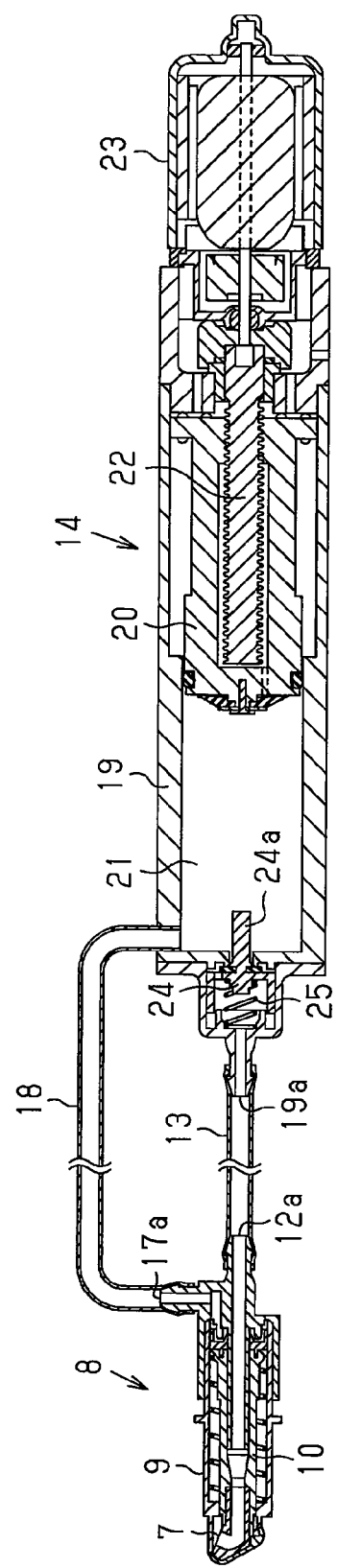
FIG. 6 is a diagram illustrating action of the second nozzle unit and an air pump.
Figure 7:
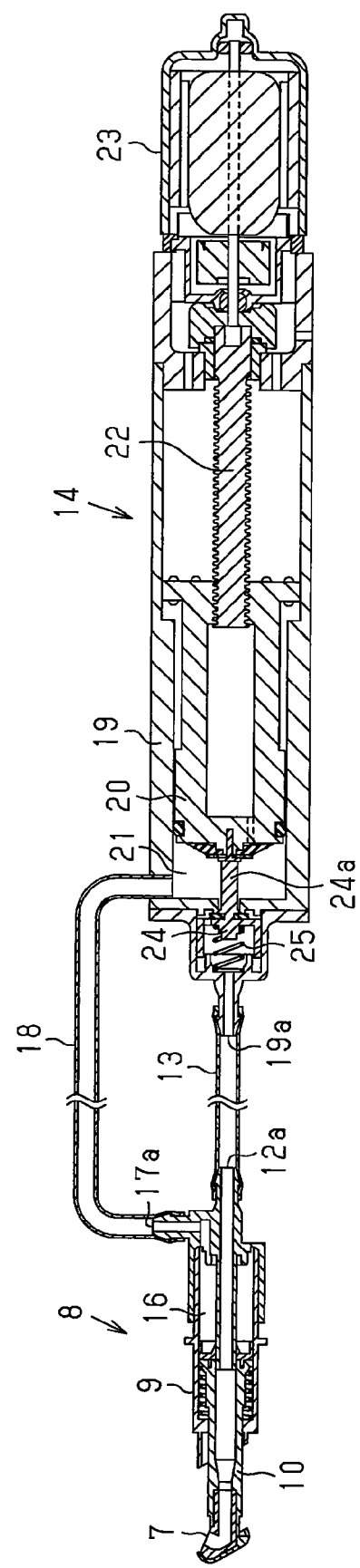
FIG. 7 is a diagram illustrating action of the second nozzle unit and the air pump.

When the operation switch SW is operated to start washing and cleaning of the lens surface 3, the air pump 14 (motor 23) is actuated to move forward the piston 20 from a back movement terminal end position as shown in the state of FIG. 6 to where the piston 20 contacts the operation bar 24a of the discharge valve 24 as shown in the state of FIG. 7. This supplies air to the sealed chamber 16 of the second nozzle unit 8 to push out and move forward the movable nozzle member 10 until the air ejection port 7 reaches the ejection position.

Figure 8:
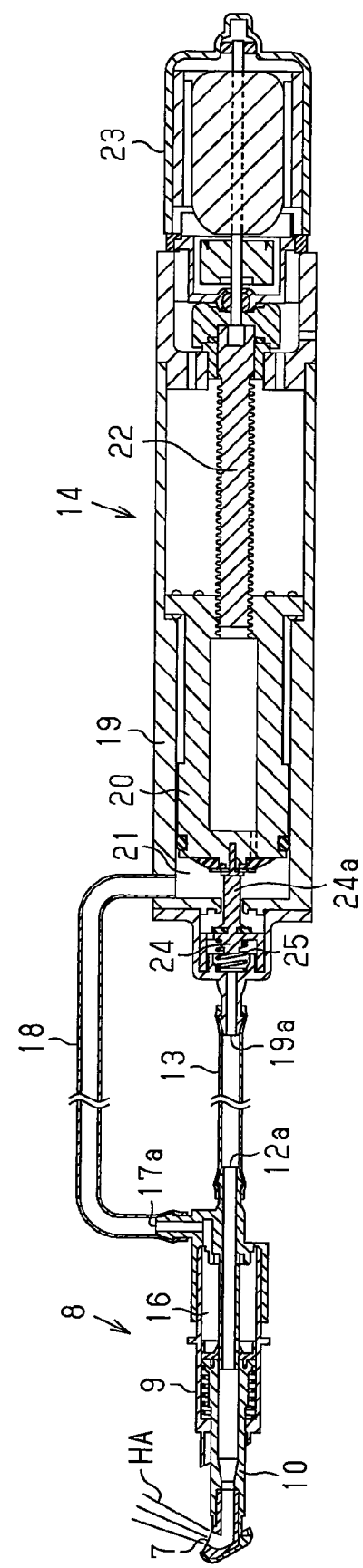
FIG. 8 is a diagram illustrating action of the second nozzle unit and the air pump.

Subsequently, as shown in FIG. 8, as the piston 20 further moves forward and pushes the operation bar 24a of the discharge valve 24, high-pressure air in the compression chamber 21 is supplied (delivered) from the second supply pipe 18 to the second nozzle unit 8 and ejected from the air ejection port 7 toward the lens surface 3. This action blows away dust and the like from the lens surface 3.

Figure 9:
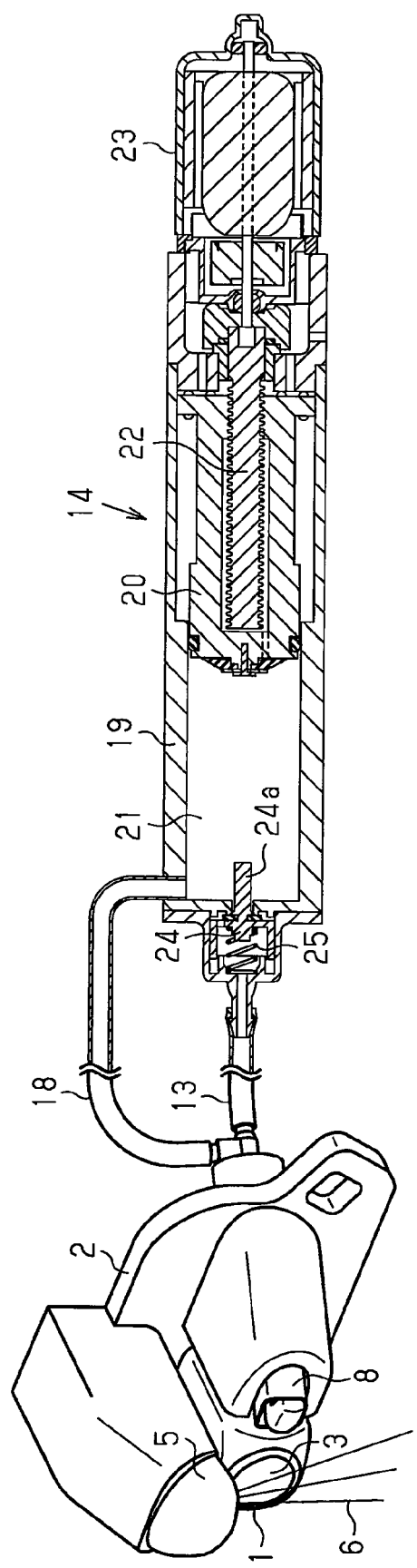
FIG. 9 is a diagram illustrating action of the onboard optical sensor cleaning device.
Figure 10:
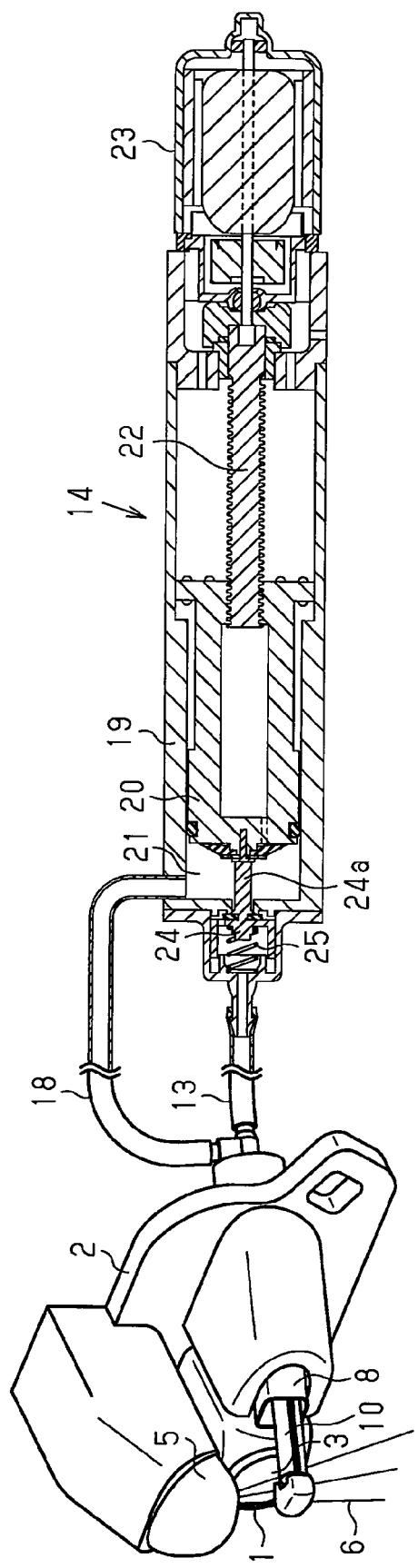
FIG. 10 is a diagram illustrating action of the onboard optical sensor cleaning device.
Figure 11:
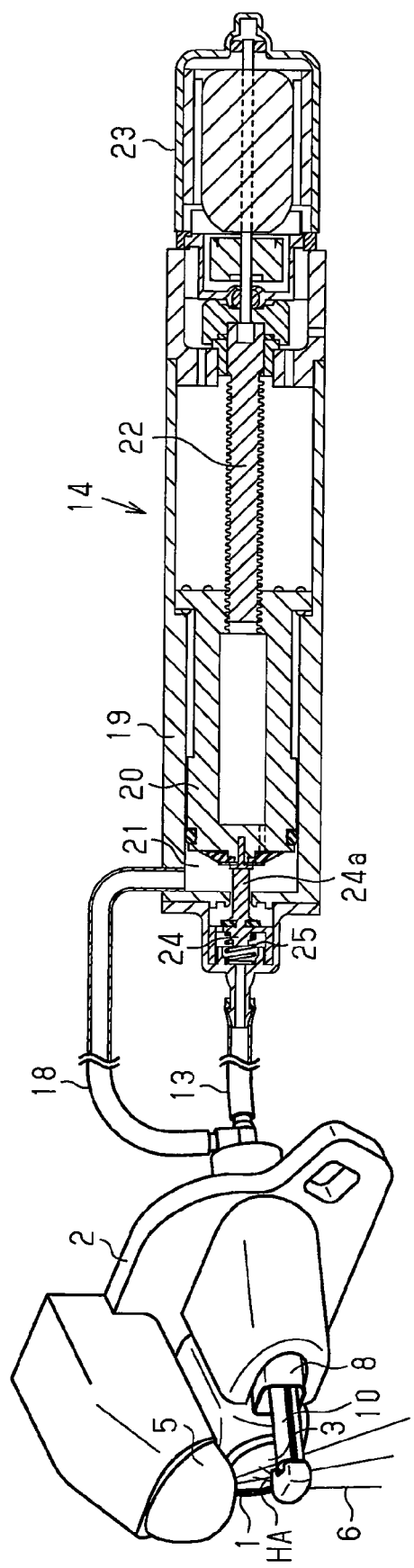
FIG. 11 is a diagram illustrating action of the onboard optical sensor cleaning device.

Continuous operation of the operation switch SW activates the air pump 14 and the washer pump P after waiting over the predetermined time t2. Then, as shown in FIG. 9, the cleaning liquid 6 supplied (delivered) from the washer pump P (refer to FIG. 3) is ejected from the cleaning liquid ejection port 4 (refer to FIG. 4). Further, as shown in FIG. 10, the movable nozzle member 10 of the second nozzle unit 8 moves forward, and the air ejection port 7 (refer to FIG. 4) moves forward to the ejection position. Then, as shown in FIG. 11, the high-pressure air HA is ejected from the air ejection port 7 (refer to FIG. 4) toward the lens surface 3.

The air ejection axis Z of the air ejection port 7 is set to be directed toward the lens surface 3 so that the ejected air HA mixes with the cleaning liquid 6 ejected from the cleaning liquid ejection port 4. Thus, the high-pressure air HA and fine particles of the cleaning liquid 6 (that is, fluid mixture of cleaning liquid 6 and air HA) are blown under high pressure against the lens surface 3. This washes away smudge from the lens surface 3.

When operation of the operation switch SW is stopped after such a cleaning action, the washer pump P is de-actuated and the air pump 14 is continuously actuated over the predetermined time t4. Thus, only the high-pressure air HA is blown against the lens surface 3. This blows away the cleaning liquid 6 from the lens surface 3 and dries the lens surface 3.

The onboard optical sensor cleaning device has the advantages described below.

(1) The cleaning liquid ejection port 4 that ejects the supplied cleaning liquid 6 is independent from the air ejection port 7 that ejects the supplied air. This avoids situations in which cleaning liquid remains in an air passage leading to the air ejection port 7 and allows for ejection of the air HA free from cleaning liquid. Further, the air ejection axis Z of the air ejection port 7 is set so that the ejected air HA mixes with the cleaning liquid 6 ejected from the cleaning liquid ejection port 4 and to be directed toward the lens surface 3. This ejects a fluid mixture of the cleaning liquid 6 and the air HA against the lens surface 3 and improves the cleaning performance.

(2) The cleaning liquid ejection port 4 is set so that the cleaning liquid ejection axis X of the ejected cleaning liquid 6 extends in a direction that differs from the direction extending toward the lens surface 3 (direction that does not intersect lens surface 3). This limits situations in which only the cleaning liquid 6 is directly ejected against the lens surface 3 and limits formation of a liquid film of the cleaning liquid 6 on the lens surface 3. That is, when the cleaning liquid 6 is ejected against the lens surface 3, the fluid mixture of the cleaning liquid 6 and the air HA is constantly ejected against the lens surface 3. This limits the formation of a liquid film of the cleaning liquid 6 on the lens surface 3 and improves the cleaning performance.

(3) The cleaning liquid ejection port 4 is set so that the cleaning liquid ejection axis X of the ejected cleaning liquid 6 passes through the position close to the air ejection port 7 between the air ejection port 7 and the lens surface 3. This mixes the cleaning liquid 6 with the air HA between the air ejection port 7 and the lens surface 3 at a position close to the air ejection port 7. Thus, as compared to when the cleaning liquid 6 mixes with the air HA at a position close to the lens surface 3, the air HA applies greater force to the cleaning liquid 6, and the cleaning liquid 6 is ejected against the lens surface 3 at a higher speed. This further improves the cleaning performance.

(4) The air ejection port 7 is arranged in the movable nozzle member 10 that moves forward and backward between the ejection position close to the position in front of the lens surface 3 and the non-ejection position located at the opposite side of the ejection position. Thus, forward movement of the air ejection port 7 to the ejection position only during cleaning does not interfere with sensing (imaging) of the onboard camera 1 in a non-cleaning state and cleans the lens surface 3 from the position close to the front of the lens surface 3 during a cleaning state. This improves the cleaning performance.

(5) The lens surface 3 includes the region closer to the air ejection port 7 than the center axis Ca and the region farther from the air ejection port 7 than the center axis Ca. The air ejection port 7 is set so that the air ejection axis Z of the ejected air HA intersects the lens surface 3 at a position in the region of the lens surface 3 closer to the air ejection port 7. This further improves the cleaning performance. That is, the flow direction of the fluid mixture of the cleaning liquid 6 and the air HA is the direction extending from the region of the lens surface 3 closer to the air ejection port 7 to the region of the lens surface 3 farther from the air ejection port 7. Thus, the region of the lens surface 3 farther from the air ejection port 7 is easy to clean, and the region of the lens surface 3 closer to the air ejection port 7 is where the flow of fluid is limited and thus difficult to clean. By setting the air ejection port 7 as described above, fluid easily flows to the region of the lens surface 3 closer to the air ejection port 7. Thus, the cleaning performance is nearly uniform from the region of the lens surface 3 closer to the air ejection port 7 to the region of the lens surface 3 farther from the air ejection port 7. This further improves the entire cleaning performance.

(6) The cleaning liquid ejection port 4 is located upward from the lens surface 3, and the air ejection port 7 is located beside the lens surface 3. This easily sets the air ejection axis Z to be directed toward the lens surface 3 so that the ejected air HA mixes with the cleaning liquid 6 ejected from the cleaning liquid ejection port 4. Further, the cleaning liquid ejection port 4, which ejects the cleaning liquid 6 that is easily affected by gravity, is located upward from the lens surface 3, and the cleaning liquid 6 is ejected from an upward position to a downward position. This stably ejects the cleaning liquid 6 in the intended direction (direction intersecting the air ejection axis Z). Consequently, the fluid mixture of the cleaning liquid 6 and the air HA is stably ejected against the lens surface 3.

(7) The cleaning liquid ejection port 4 includes the constriction 4a including the two opposing surfaces spaced apart by a narrow gap and the two opposing surfaces spaced apart by a wide gap. The ejected cleaning liquid 6 is wall-like and includes two planar surfaces. The air ejection port 7 is set so that the air ejection axis Z of the ejected air HA intersects (in the present embodiment, is orthogonal to) the planar surfaces of the wall-like cleaning liquid 6. This uniformly ejects the cleaning liquid 6 against the entire lens surface 3. Thus, the cleaning performance is further improved.

(8) The second nozzle unit 8 includes the movable nozzle member 10, which includes the air ejection port 7, and the housing (case 9 and basal end closing member 11) that supports the movable nozzle member 10 to move the movable nozzle member 10 forward and backward. Thus, for example, the movable nozzle member 10 is moved forward only during cleaning so as not to interfere with sensing (imaging) of the onboard camera 1 during non-cleaning and so that the air HA is ejected against the lens surface 3 from the position close to the front of the lens during cleaning. This improves the cleaning performance. Further, the housing (case 9 and basal end closing member 11) includes the ejection air intake port 12a that is in communication with the air ejection port 7 of the movable nozzle member 10 when the movable nozzle member 10 is moved forward. The air drawn from the ejection air intake port 12a is ejected from the air ejection port 7 when the movable nozzle member 10 is moved forward. Additionally, the housing (case 9 and basal end closing member 11) includes the forward movement air intake port 17a that is in communication with the sealed chamber 16 defined by the basal end portion of the movable nozzle member 10. The air drawn from the forward movement air intake port 17*a* moves forward the movable nozzle member 10. The ejection air intake port 12*a* is separate from the forward movement air intake port 17*a*, and the sealed chamber 16 is independent from (is not in communication with) the air ejection port 7. Thus, for example, the action for moving forward the movable nozzle member 10 can be performed independently from the action for ejecting the air HA from the air ejection port 7. This performs the cleaning action without waste, for example, waste that would occur when a movable nozzle member is moved forward by fluid that is drawn from a single intake port and ejected from an ejection port (more specifically, waste in which fluid leaks from ejection port while movable nozzle member is moving forward). This efficiently improves the cleaning performance. Additionally, for example, when a movable nozzle member is moved forward by fluid that is drawn from a single intake port and ejected from an ejection port, the fluid may leak from the ejection port as the movable nozzle member moves forward. As a result, the movable nozzle member may not move to the extreme distal end. The present embodiment avoids such a situation.

(9) The fluid ejection nozzle is the second nozzle unit 8 that ejects air from the air ejection port 7 serving as the fluid ejection port. This, for example, increases the effect of avoiding the waste described above. That is, for example, waste that would occur when a movable nozzle member is moved forward by air that is drawn from a single intake port and ejected from an ejection port (more specifically, waste in which air leaks from ejection port while movable nozzle member is moving forward) would become more prominent as compared to when liquid is ejected (this is because air is smaller than liquid in mass and viscosity). Such a waste that would become prominent is avoided. This increases the effect.

(10) The fluid entering the forward movement air intake port 17*a* serving as the forward movement fluid intake port is air. This allows, for example, the movable nozzle member 10 to smoothly move backward. That is, since air has a lower viscosity than liquid, air is released from the sealed chamber 16 more easily than liquid when the movable nozzle member 10 moves backward. Thus, the movable nozzle member 10 smoothly moves backward.

(11) The air drawn the forward movement air intake port 17*a* into the sealed chamber 16 is released from the forward movement air intake port 17*a*. This eliminates the need to arrange a plurality of openings through which the inside and outside of the sealed chamber 16 are in communication. Thus, the housing (case 9 and basal end closing member 11) is simplified.

(12) The onboard optical sensor cleaning device includes a single air pump 14 that supplies air to the forward movement air intake port 17*a* to move forward the movable nozzle member 10 and supply air to the ejection air intake port 12*a* to eject the air HA from the air ejection port 7. This eliminates the need for a plurality of electric pumps and thus simplifies the structure.

(13) The air pump 14 includes the discharge valve 24 located between the compression chamber 21 and the discharge port 19*a*. The discharge valve 24 is operated and opened by the piston 20 when it moves forth. The forward movement air intake port 17*a* is in direct communication with the compression chamber 21, and the ejection air intake port 12*a* is in communication with the discharge port 19*a* (that is, with compression chamber 21 through discharge valve 24). Thus, when the piston 20 moves forth, the volume of the compression chamber 21 is reduced and air in the compression chamber 21 is compressed. Further, air is supplied through the forward movement air intake port 17*a* to the sealed chamber 16 to move forward the movable nozzle member 10. When the piston 20 further moves forth, the discharge valve 24 is operated and opened by the piston 20 (compression chamber 21 is in communication with discharge port 19*a*). Then, air compressed in the compression chamber 21 is discharged out of the discharge port 19*a* instantaneously, and the air is ejected from the air ejection port 7 via the ejection air intake port 12*a*. Thus, more specifically, with a simple structure, the single air pump 14 moves forward the movable nozzle member 10 and then ejects air from the air ejection port 7.

(14) The sensing surface 3 is a spherical lens surface. This increases the effect obtained by ejecting air from the position close to the front of the sensing surface 3.

The above embodiment may be modified as described below.

In the above embodiment, the cleaning liquid ejection port 4 is set so that the cleaning liquid ejection axis X of the ejected cleaning liquid 6 extends in the direction that differs from the direction extending toward the lens surface 3 (direction that does not intersect lens surface 3). Instead, as long as the cleaning liquid ejection port 4 is set so that the ejected cleaning liquid 6 intersects the air ejection axis Z, the cleaning liquid ejection port 4 may be set so that the cleaning liquid ejection axis X intersects the lens surface 3.

In the above embodiment, the cleaning liquid ejection port 4 is set so that the cleaning liquid ejection axis X of the ejected cleaning liquid 6 passes through the position close to the air ejection port 7 between the air ejection port 7 and the lens surface 3. Instead, the cleaning liquid ejection port 4 may be set so that the cleaning liquid ejection axis X passes through the position close to the lens surface 3.

In the above embodiment, the air ejection port 7 is provided on the movable nozzle member 10. Instead, the air ejection port 7 may be provided so that the position relative to the lens surface 3 is fixed.

In the above embodiment, the cleaning liquid ejection port 4 is provided so that the position relative to the lens surface 3 is fixed. Instead, the cleaning liquid ejection port 4 may be provided on the movable nozzle member in a movable manner.

In the above embodiment, the air ejection port 7 is set so that the air ejection axis Z of the ejected air HA intersects the lens surface 3 at the position in the region of the lens surface 3 closer to the air ejection port 7. Instead, for example, the air ejection port 7 may be set so that the air ejection axis Z intersects the lens surface 3 at the position of the center axis Ca of the lens surface 3. Additionally, for example, the air ejection port 7 may be set so that the air ejection axis Z intersects the lens surface 3 at the position in the region of the lens surface 3 farther from the air ejection port 7.

In the above embodiment, the cleaning liquid ejection port 4 is located upward from the lens surface 3, and the air ejection port 7 is located beside the lens surface 3. Instead, the cleaning liquid ejection port 4 and the air ejection port 7 may be located at other positions. For example, the cleaning liquid ejection port 4 may be located beside the lens surface 3, and the air ejection port 7 may be located upward from the lens surface 3.

In the above embodiment, the cleaning liquid ejection port 4 includes the constriction 4*a* including the two surfaces spaced apart by a narrow gap and the two surface spaced apart by a wide gap. Instead, the cleaning liquid ejection port 4 may be less the constriction 4a (for example, round cleaning liquid ejection port).

In the above embodiment, the air pump 14 includes the discharge valve 24. This allows high-pressure air to be instantaneously ejected so that the high-pressure air HA is instantaneously ejected from the air ejection port 7. Instead, for example, the air pump may continue to discharge air so that air continues to be ejected from the air ejection port 7.

The control of the washer pump P and the air pump 14 by the controller 31 of the above embodiment may be changed. For example, in the above embodiment, when the operation switch SW is operated, the control of actuating only the air pump 14 is first performed. Instead, when the operation switch SW is operated, the washer pump P and the air pump 14 may be first actuated together.

In the above embodiment, the onboard optical sensor is the onboard camera 1 arranged at the back door Ba. Instead, for example, the onboard optical sensor may be applied to other onboard optical sensors such as an onboard camera arranged at the front of the vehicle. Further, the cleaning subject (sensing surface) is not limited to the lens surface 3 and may be a protection glass exposed to the outside to protect an onboard optical sensor or the onboard optical sensor cleaning device that cleans the protection glass.

The sealed chamber 16 of the above embodiment may be in communication with a release part that allows fluid (air) to be released to the outside.

Figure 13:
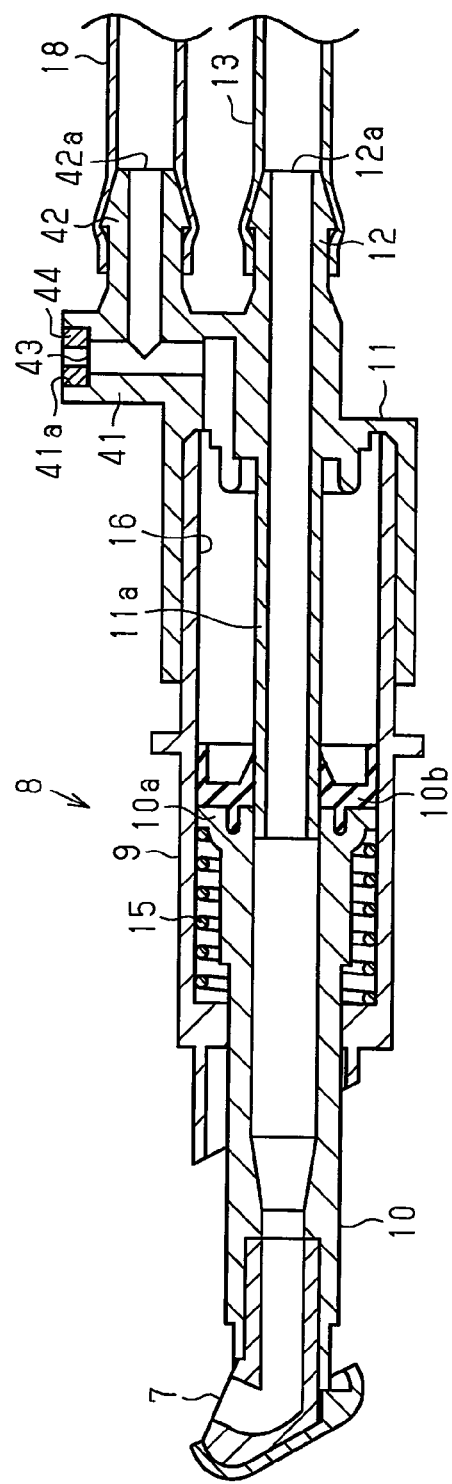
FIG. 13 is a cross-sectional view showing a further example of the second nozzle unit.
Figure 14:
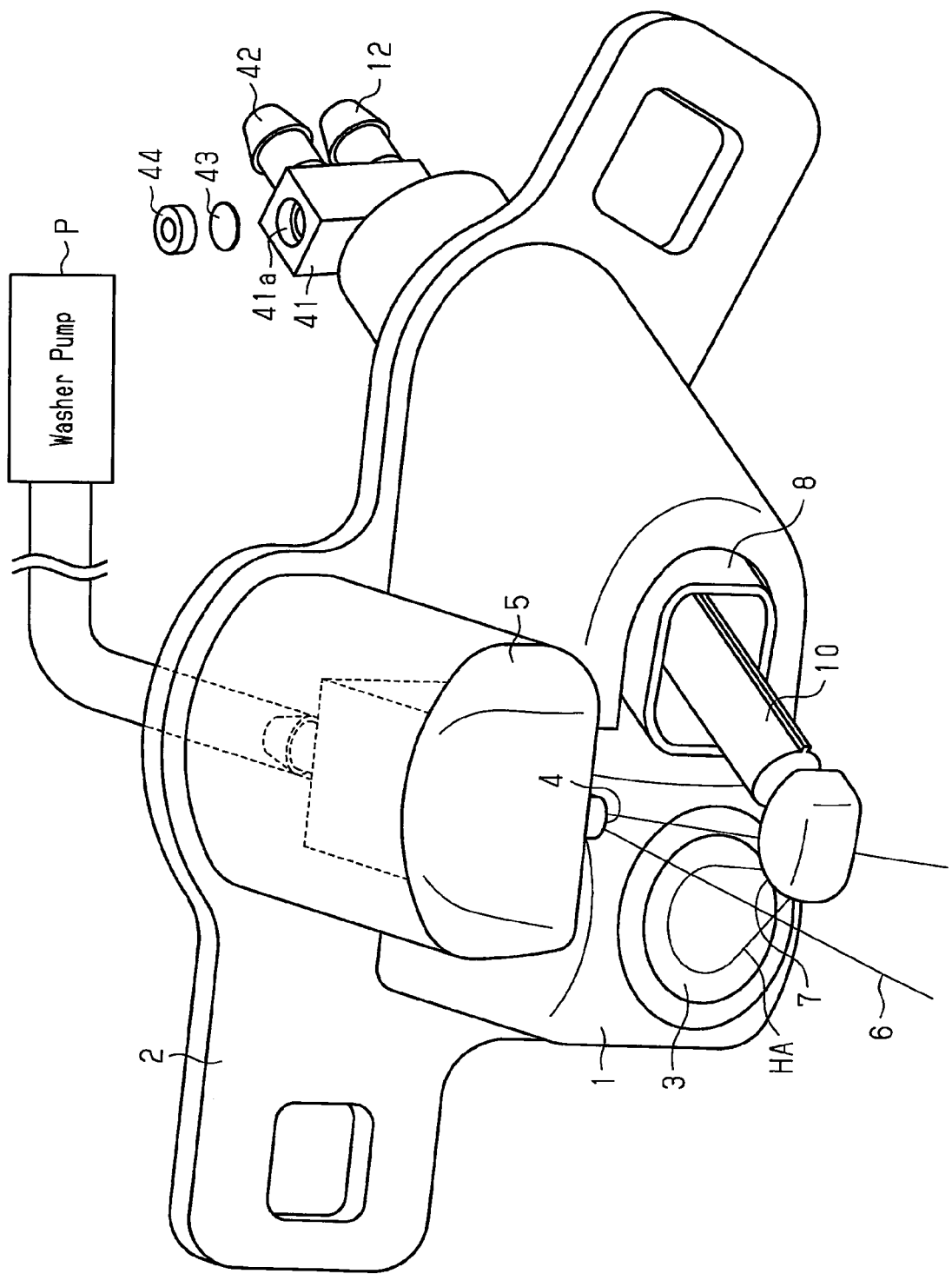
FIG. 14 is a perspective view showing a first nozzle unit and the second nozzle unit of the further example.

For example, as shown in FIGS. 13 and 14, the second nozzle unit 8 is changed. As shown in FIG. 13, instead of the second joint 17 of the above embodiment, the basal end closing member 11 of this example includes a communication pipe 41 that extends in a direction orthogonal to the first joint 12 and is in communication with the sealed chamber 16. The basal end closing member 11 further includes a second joint 42 extending from an intermediate portion of the communication pipe 41 in parallel to the first joint 12. The second joint 42 includes an forward movement air intake port 42a that is in communication with the sealed chamber 16. In the same manner as the above embodiment, the air pump 14 (refer to FIG. 2) is connected to the second joint 42 by the second supply pipe 18.

A distal end portion of the communication pipe 41 includes a waterproof moisture permeable material 43 that forms the release part allowing air to be released to the outside. More specifically, the distal end portion of the communication pipe 41 includes an accommodation recess 41a that opens with a larger diameter than a passage diameter of the communication pipe 41. The waterproof moisture permeable material 43 is located at a closed end of the accommodation recess 41a to close the passage of the communication pipe 41. Further, an annular fixing member 44 is press-fitted and fixed to the accommodation recess 41a to hold a rim of the waterproof moisture permeable material 43 together with the closed end of the accommodation recess 41a. The waterproof moisture permeable material 43 is waterproof and breathable. Further, the communication pipe 41 allows air to be released to the outside through the waterproof moisture permeable material 43, and the release capacity (release amount per unit of time) of the waterproof moisture permeable material 43 (release part) is set to be extremely small. More specifically, when the air pump 14 (motor 23) is actuated to move the piston 20 from the back movement terminal end position to the front movement terminal end position (that is, position where operation bar 24a is pushed), the release capacity of the waterproof moisture permeable material 43 (release part) is set so that air is hardly released.

As a result, for example, even if the air pump 14 stops moving for one reason or another when the piston 20 contacts the operation bar 24a or is moved forward to the vicinity of the operation bar 24a to move forward the movable nozzle member 10, air is gradually released from the waterproof moisture permeable material 43 to the outside. This reduces (depressurizes) the air in the sealed chamber 16 and moves backward (recedes) the movable nozzle member 10. Thus, even if the air pump 14 stops moving for one reason or another such as failure, situations in which the movable nozzle member 10 remains moved forward are avoided. For example, situations in which the movable nozzle member 10 interferes with sensing (imaging) of the onboard camera 1 are avoided. Further, since the release part having such a function is formed by the waterproof moisture permeable material 43 that is waterproof and breathable, for example, the entrance of liquid into the sealed chamber 16 is prevented.

Additionally, in the further example described above, the release part is formed by the waterproof moisture permeable material 43. Instead, as long as fluid (air) in the sealed chamber 16 can be gradually released to the outside, for example, the release unit may have another structure such as a minute through hole. In addition, the release part (waterproof moisture permeable material 43 or minute through hole) may be arranged at other portions such as the case 9, the second supply pipe 18, and the pump case 19.

In the above embodiment, the fluid ejection nozzle is the second nozzle unit 8 that ejects air from the air ejection port 7 serving as the fluid ejection port. Instead, the fluid ejection nozzle may be changed to a nozzle that ejects liquid (cleaning liquid).

In the above embodiment, the air (fluid) entering the sealed chamber 16 from the forward movement air intake port 17a is released from the forward movement air intake port 17a. Instead, a separate opening through which the fluid entering the sealed chamber 16 is released may be arranged.

The above embodiment includes the single air pump 14 that supplies air to the forward movement air intake port 17a to move forward the movable nozzle member 10 and then supplies air to the ejection air intake port 12a to eject the air from the air ejection port 7. Instead, for example, a pump that supplies air to the forward movement air intake port 17a and a pump that supplies air to the ejection air intake port 12a may be separately arranged. Further, the forward movement air intake port 17a may include a liquid pump as an intake port through which liquid is drawn. That is, the forward movement air intake port 17a may have a structure of supplying liquid to the sealed chamber 16 to move forward the movable nozzle member 10.

In the above embodiment, air and cleaning liquid are ejected. Instead, the onboard optical sensor cleaning device does not have to include the cleaning liquid ejection port 4 and may eject only air.

In the above embodiment, the ejection air intake port 12a is in communication with the air ejection port 7 of the movable nozzle member 10 regardless of a state in which the movable nozzle member 10 is moving forward or backward. Instead, as long as the ejection air intake port 12a is in communication with the air ejection port 7 of the movable nozzle member 10 when at least the movable nozzle member 10 is moved forward, the ejection air intake port 12a may be changed.

The invention claimed is:

1. An onboard optical sensor cleaning device that ejects fluid against a sensing surface of an onboard optical sensor installed in a vehicle and removes foreign matter from the sensing surface, the onboard optical sensor cleaning device comprising:
   a cleaning liquid ejection port that ejects supplied cleaning liquid; and an air election nozzle including a movable nozzle member that includes an air ejection port that ejects supplied air and a housing that supports the movable nozzle member to be movable forward and backward,
   wherein the cleaning liquid ejection port and the air ejection port are independent from each other,
   the housing includes:
      an election air intake port that is in communication with the air election pert of the movable nozzle member when at least the movable nozzle member is moved forward, and
      a forward movement fluid intake port that is in communication with a sealed chamber defined by a seal member arranged on a basal end portion of the movable nozzle member, wherein the forward movement fluid intake port allows fluid to enter the sealed chamber via an inlet location, and wherein the fluid can only exit the sealed chamber through the inlet location, and
   an air ejection axis of the air ejection port is set so that the ejected air mixes with the cleaning liquid ejected from the cleaning liquid ejection port and to be directed toward the sensing surface.

2. The onboard optical sensor cleaning device according to claim 1, wherein the cleaning liquid ejection port is set so that a cleaning liquid ejection axis of the ejected cleaning liquid extends in a direction that differs from a direction extending toward the sensing surface.

3. The onboard optical sensor cleaning device according to claim 1, wherein the cleaning liquid ejection port is set so that a cleaning liquid ejection axis of the ejected cleaning liquid passes through a position closer to the air ejection port than the sensing surface between the air ejection port and the sensing surface.

4. The onboard optical sensor cleaning device according to claim 1, wherein the movable nozzle is movable between an ejection position at which the air election port is positioned in front of the sensing surface and a non-ejection position located at an opposite side of the ejection position.

5. The onboard optical sensor cleaning device according to claim 1, wherein:
   the sensing surface includes a region closer to the air ejection port than a center axis of the sensing surface and a region farther from the air ejection port than the center axis of the sensing surface, and
   the air ejection port is set so that the air ejection axis of the ejected air intersects the sensing surface at a position in the region of the sensing surface closer to the air ejection port.

6. The onboard optical sensor cleaning device according to claim 1, wherein:
   the cleaning liquid ejection port includes a constriction configured to eject wall-like cleaning liquid, and
   the air ejection port is set so that the air ejection axis of the ejected air intersects the wall-like cleaning liquid.

7. The onboard optical sensor cleaning device according to claim 1, wherein the fluid entering the forward movement fluid intake port is air.

8. The onboard optical sensor cleaning device according to claim 1, wherein the fluid entering the sealed chamber from the forward movement fluid intake port is released from the forward movement fluid intake port.

9. The onboard optical sensor cleaning device according to claim 7, further comprising a single air pump that supplies air to the forward movement fluid intake port to move forward the movable nozzle member and then supplies the air to the ejection air intake port to eject the air from the air ejection port.

10. The onboard optical sensor cleaning device according to claim 9, wherein the air pump includes:
   a tubular pump case including a discharge port,
   a piston arranged in the pump case so as to be movable back and forth, wherein the piston varies a volume of a compression chamber in the pump case,
   a motor that drives the piston back and forth, and
   a discharge valve located between the compression chamber and the discharge port, wherein the discharge valve is opened by the piston when the piston moves forth, and
   the forward movement fluid intake port is in communication with the compression chamber, and the ejection air intake port is in communication with the discharge port.

11. The onboard optical sensor cleaning device according to claim 1, wherein the sealed chamber is in communication with a release port that allows fluid to be released to an outside of the cleaning device.

12. The onboard optical sensor cleaning device according to claim 11, wherein:
   the fluid supplied to the sealed chamber is air, and
   the release port is breathable and waterproof from the outside of the cleaning device.

13. The onboard optical sensor cleaning device according to claim 1, wherein the sensing surface is a lens surface.

* * * * *